(12) United States Patent
Hohshi et al.

(10) Patent No.: US 9,709,835 B2
(45) Date of Patent: Jul. 18, 2017

(54) LIQUID CRYSTAL MODULE AND ELECTRONIC DEVICE

(71) Applicant: Sharp Kabushiki Kaisha, Osaka-shi, Osaka (JP)

(72) Inventors: Norikazu Hohshi, Osaka (JP); Toshihiro Yanagi, Osaka (JP); Xiaomang Zhang, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 179 days.

(21) Appl. No.: 14/441,904

(22) PCT Filed: Oct. 28, 2013

(86) PCT No.: PCT/JP2013/079105
§ 371 (c)(1),
(2) Date: May 11, 2015

(87) PCT Pub. No.: WO2014/077112
PCT Pub. Date: May 22, 2014

(65) Prior Publication Data
US 2015/0331268 A1 Nov. 19, 2015

(30) Foreign Application Priority Data
Nov. 15, 2012 (JP) ................. 2012-251214

(51) Int. Cl.
*H01F 27/42* (2006.01)
*G02F 1/133* (2006.01)
(Continued)

(52) U.S. Cl.
CPC .... *G02F 1/13306* (2013.01); *G02F 1/133553* (2013.01); *H01F 27/2804* (2013.01);
(Continued)

(58) Field of Classification Search
CPC ...... H01F 38/14; H01F 27/2804; H02J 5/005; H02J 7/0013; H02J 7/025; G02F 1/133553
(Continued)

(56) References Cited

U.S. PATENT DOCUMENTS

| 2008/0258679 | A1* | 10/2008 | Manico | H02J 7/025 320/106 |
| 2012/0049645 | A1* | 3/2012 | Kozakai | H04B 5/0037 307/104 |
| 2012/0176317 | A1 | 7/2012 | Jin | |

FOREIGN PATENT DOCUMENTS

| CN | 202153655 U | | 2/2012 | |
| JP | 2011141567 | * | 4/2011 | ........... G02F 1/1335 |

(Continued)

OTHER PUBLICATIONS

Official Communication issued in International Patent Application No. PCT/JP2013/079105, mailed on Jan. 28, 2014.

*Primary Examiner* — Jared Fureman
*Assistant Examiner* — Duc M Pham
(74) *Attorney, Agent, or Firm* — Keating & Bennett, LLP

(57) ABSTRACT

A liquid crystal module (1) of the present invention includes: a backlight (2) (a lighting device) that emits a light; a liquid crystal panel (3) that is struck by a light emitted from the lighting device; and a power transmitting coil (4) that receives a voltage from an AC power supply, generates a magnetic field, and transfers an electrical power to a device to be charged.

19 Claims, 10 Drawing Sheets

(51) Int. Cl.

| | |
|---|---|
| *G02F 1/1335* | (2006.01) |
| *H01F 38/14* | (2006.01) |
| *H02J 5/00* | (2016.01) |
| *H02J 7/02* | (2016.01) |
| *H01F 27/28* | (2006.01) |
| *H02J 7/00* | (2006.01) |

(52) U.S. Cl.
CPC .............. *H01F 38/14* (2013.01); *H02J 5/005* (2013.01); *H02J 7/025* (2013.01); *H02J 7/0013* (2013.01)

(58) Field of Classification Search
USPC .......................................................... 307/104
See application file for complete search history.

(56) References Cited

FOREIGN PATENT DOCUMENTS

| | | | | |
|---|---|---|---|---|
| JP | 2011244624 | * | 5/2011 | .............. H02J 17/00 |
| JP | 2011-141567 A | | 7/2011 | |
| JP | 2011-244624 A | | 12/2011 | |
| JP | 4852829 B2 | | 1/2012 | |
| JP | 2012-049434 A | | 3/2012 | |
| JP | 2014-003790 A | | 1/2014 | |

\* cited by examiner

LIQUID CRYSTAL MODULE AND ELECTRONIC DEVICE

TECHNICAL FIELD

The present invention relates to liquid crystal module and an electronic device.

The subject application claims priority based on the patent application No. 2012-251214 filed in Japan on Nov. 15, 2012 and incorporates by reference herein the content thereof.

BACKGROUND ART

In the field of mobile electronic devices such as mobile telephones, because of its superior waterproofness, dust-proofness, and rustproofness, so-called contactless charging, which is charging without going through an electronic contact such as between a mobile electronic device and a power cable, has come into widespread use. There are a number of systems for contactless charging. One is electromagnetic induction type contactless charging using electromagnetic induction between a power transmitting coil of a charger and a power receiving coil of a device to be charged. The Qi standard of the WPC (Wireless Power Consortium) has been established as an international standard for contactless charging. This enables a single contactless charger to handle charging of different mobile devices.

A contactless power transmitting device aimed at achieving a thinner power transmitting coil and power receiving coil used in contactless charging has been proposed (refer to, for example, Patent Document 1 noted below). Patent Document 1 discloses a contactless power transmitting device having a power transmitting device functioning as a charger, a power receiving device (first mobile telephone) that includes a secondary battery functioning as the power supply for the main unit of a portable telephone, and a power transmitting-receiving sharing device (second mobile telephone) functioning as a charger and including a secondary battery that serves as a power supply for the main unit of a mobile telephone.

PRIOR ART DOCUMENT

Patent Document

[Patent Document 1] Japanese Patent Publication No. 4852829

SUMMARY OF THE INVENTION

Problem to be Solved by the Invention

Even with the establishment of an international standard for contactless charging as noted above, a contactless charger is still essential when performing charging.

According to the contactless power transmitting device of Patent Document 1, using a power transmitting device functioning as a charger, it is possible to charge a secondary battery of the first mobile telephone. Additionally, Patent Document 1 has language stating that even if it is no longer possible to use the first mobile telephone having a power receiving device, it is possible to conveniently use the second mobile telephone having a power transmitting-receiving sharing device to charge the secondary battery of the first mobile telephone. However, even the contactless power transmitting device of Patent Document 1 requires a power transmitting device functioning as a charger when performing charging. In this manner, it has not been conventionally thought possible to perform contactless charging without using a charger. For this reason, it has been inconvenient to carry a charger around together with a mobile device when going outside or on a trip carrying a mobile device.

The present invention is made to solve the above-noted problem, and has as an object to provide a liquid crystal module and an electronic device capable of contactless charging of a mobile electronic device or the like without using a dedicated contactless charger.

Means to Solve the Problem

To achieve the above-described object, a liquid crystal module according to one aspect of the present invention includes: a lighting device that emits a light; a liquid crystal panel that is struck by a light emitted from the lighting device; and a power transmitting coil that receives a voltage from an AC power supply, generates a magnetic field, and transfers an electrical power to a device to be charged.

The liquid crystal module according to one aspect of the present invention further may include: a reflective plate disposed on a side of the lighting device opposite from a side on which the liquid crystal panel is disposed, wherein the power transmitting coil may be provided on the reflective plate.

In the liquid crystal module according to one aspect of the present invention, a display surface of the liquid crystal panel may be made as a surface on which a device to be charged is placed.

In the liquid crystal module according to one aspect of the present invention, the power transmitting coil may be installed on a surface of the reflective plate opposite from a side on which the lighting device is disposed.

In the liquid crystal module according to one aspect of the present invention, the power transmitting coil may be embedded within the reflective plate.

The liquid crystal module according to one aspect of the present invention may include a plurality of the power transmitting coils.

The liquid crystal module according to one aspect of the present invention may further include a power transmitting circuit and a voltage converter, wherein the power transmitting circuit, the voltage converter, and the power transmitting coil may constitute a power transmitting device.

In the liquid crystal module according to one aspect of the present invention, the power transmitting circuit and the voltage converter may be disposed on a drive board of the liquid crystal panel.

In the liquid crystal module according to one aspect of the present invention, the voltage converter may be an AC/DC converter, and a voltage from the AC power supply may be supplied to the AC/DC converter via a power supply cable.

In the liquid crystal module according to one aspect of the present invention, the voltage converter may be a DC/DC converter, and a voltage from the AC power supply may be supplied to the DC/DC converter via an AC adaptor.

An electronic device according to one aspect of the present invention includes a liquid crystal module according to one aspect of the present invention.

An electronic device according to one aspect of the present invention includes a liquid crystal module according to one aspect of the present invention, wherein the power transmitting circuit and the voltage converter are disposed on a control board of a main unit of an electronic device.

Effect of the Invention

According to an embodiment of the present invention, it is possible to implement a liquid crystal module and an electronic device capable of contactless charging of a mobile electronic device or the like without using a dedicated contactless charger.

EMBODIMENT FOR CARRYING OUT THE INVENTION

First Embodiment

The first embodiment of the present invention will be described below, with references made to FIG. 1 to FIG. 4.

In the present embodiment, the description is for an example of a tablet computer having a liquid crystal module as the electronic device of the present invention. In the following, the tablet computer will be referred simply as the tablet.

Figure 1:
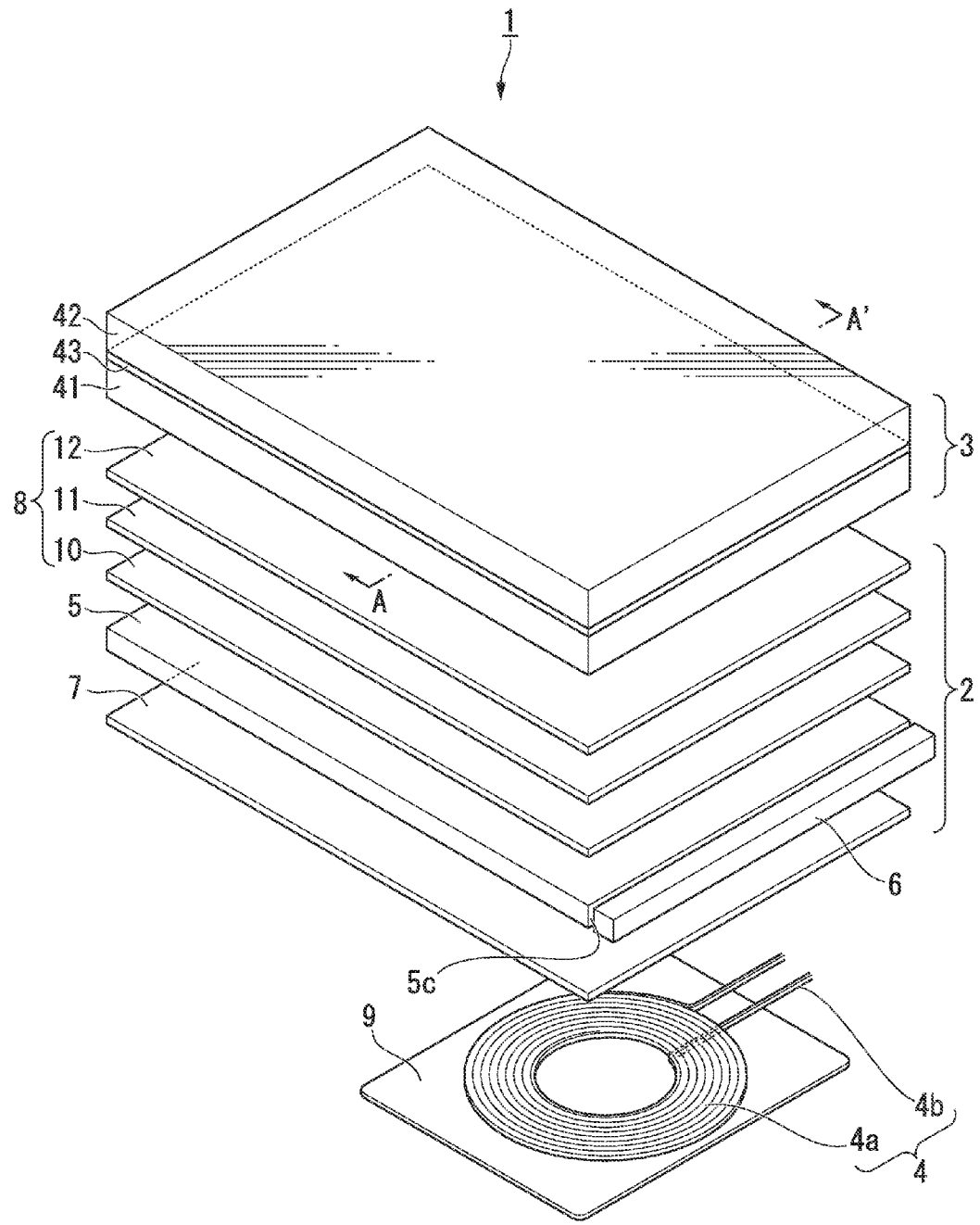
FIG. 1 is an oblique view showing a liquid crystal module according to a first embodiment.
Figure 2:
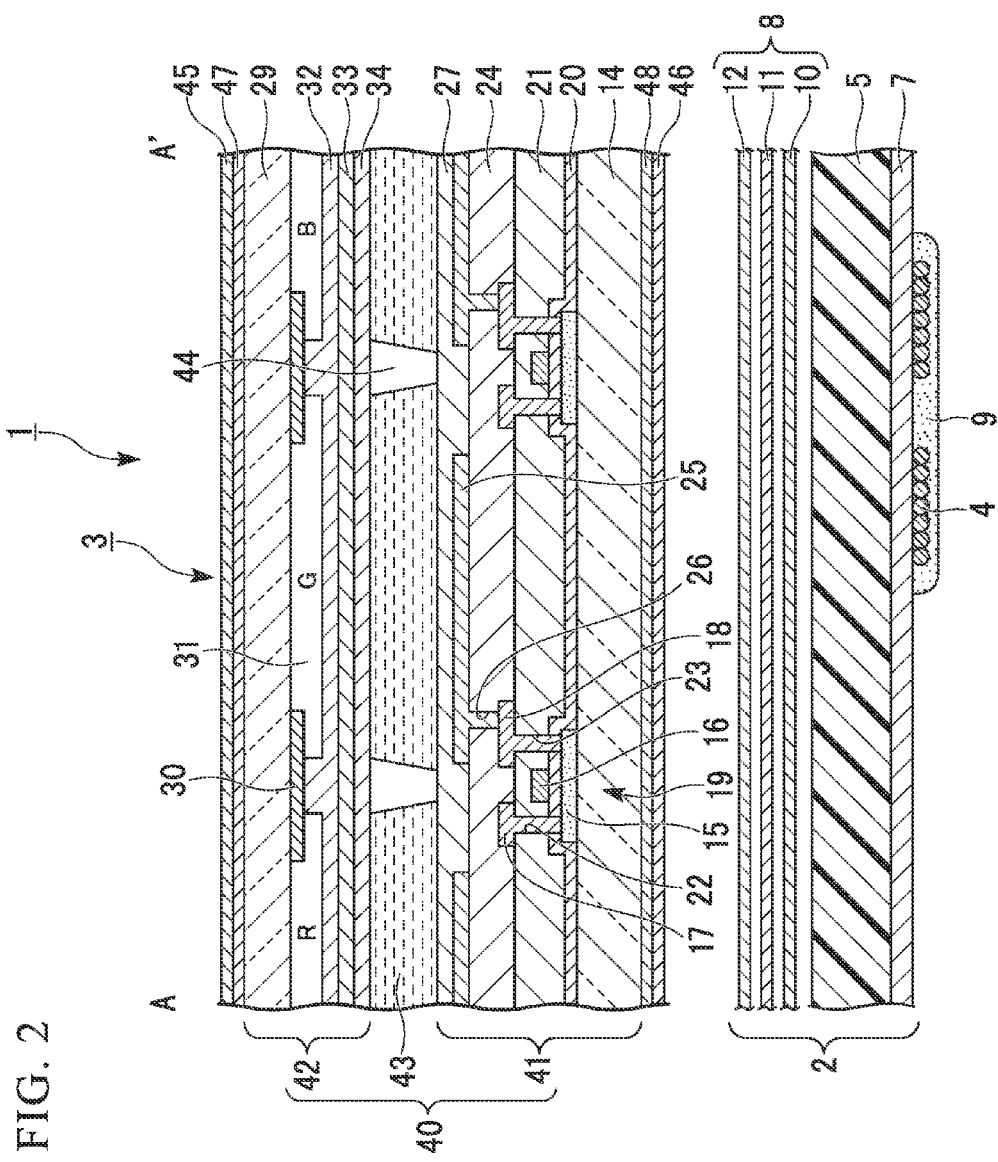
FIG. 2 is a cross-sectional view along the line A-A' in FIG. 1.
Figure 3:
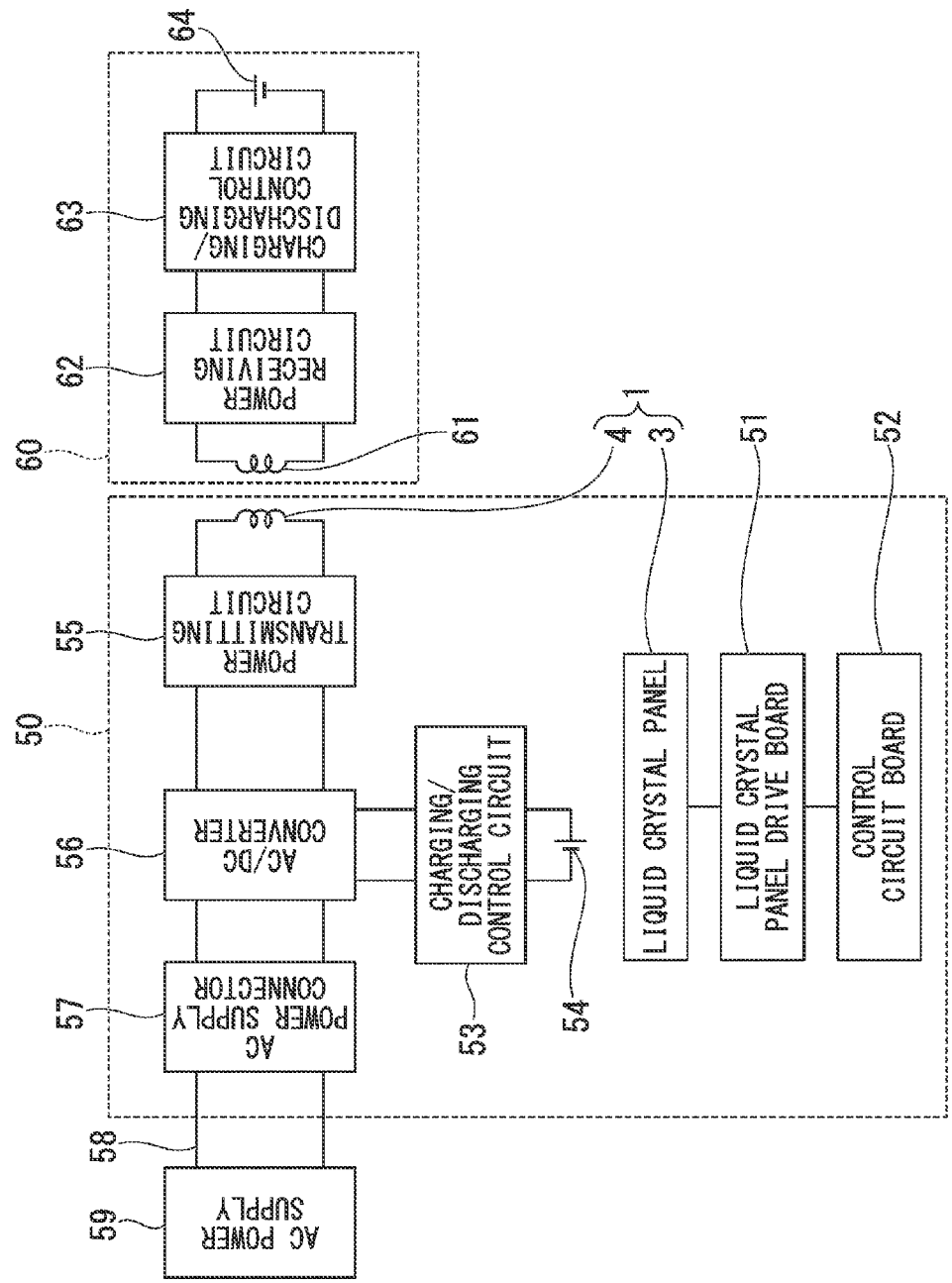
FIG. 3 is a circuit block diagram of an electronic device that includes a liquid crystal module according to the first embodiment.
Figure 4:
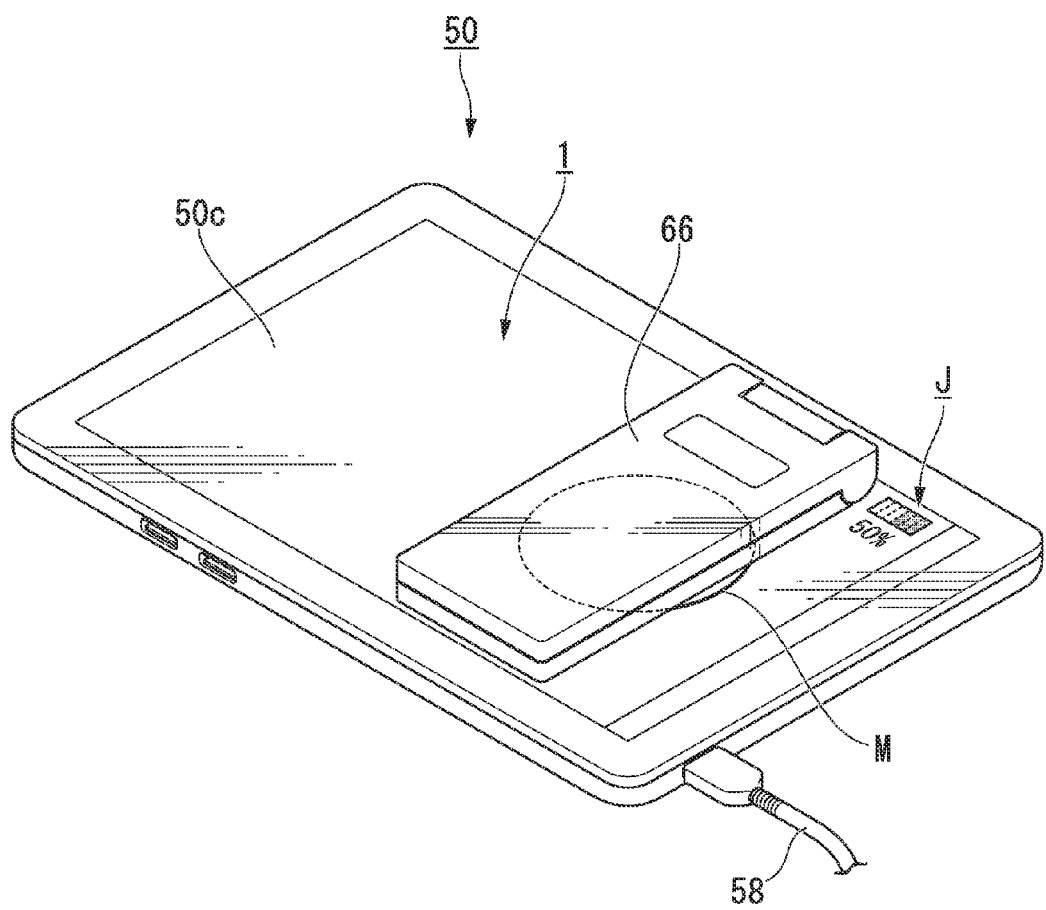
FIG. 4 is an oblique view showing the condition in which charging is performed using an electronic device according to the first embodiment.

FIG. 1 is an oblique view showing only the liquid crystal module part of a tablet of the present embodiment. FIG. 2 is a cross-sectional view along the line A-A' in FIG. 1. FIG. 3 is a circuit block diagram of the tablet of the present embodiment. FIG. 4 is an oblique view showing the condition in which charging is performed of a mobile telephone using the tablet of the present embodiment.

In the drawings discussed below, to aid in seeing the various constituent elements, some constituent elements are shown to a different dimensional scale.

As shown in FIG. 1, a liquid crystal module 1 of the present embodiment has a backlight 2 (lighting device), a liquid crystal panel 3, and a power transmitting coil 4. The backlight 2 emits light that illuminates the liquid crystal panel 3. The liquid crystal panel 3 is struck by light emitted from the backlight 2 and modulates the transmissivity of the light in units of pixels, so as to display characters or images. The power transmitting coil 4 receives a voltage from an AC power supply and generates a magnetic field, and transmits electrical power wirelessly to the device to be charged. A user views the display of the liquid crystal panel 3 from the side opposite from the side on which the backlight 2 is disposed (upper side in FIG. 1). For this reason, in the description to follow, the side toward the user as seen from the user (upper side in FIG. 1) will be called the front side, and the inward side as seen from the user (lower side in FIG. 1) will be called the rear side.

The backlight 2 has a light-guiding sheet 5, a light source 6, a reflective plate 7, and an optical sheet group 8. The light-guiding sheet 5 is a transparent sheet member capable of propagating light through it internally. The light-guiding sheet 5 is constituted by, for example, a transparent acrylic sheet. The light source 6 often uses, for example, light-emitting diodes (LEDs). Alternatively, the light source 6 may use a cold-cathode tube or the like. The light source 6 is installed on an end face 5c of the light-guiding sheet 5 so that the side thereof that emits light faces the light-guiding sheet 5. By this constitution, light emitted from the light source 6 strikes the light-guiding sheet 5 from the end face 5c of the light-guiding sheet 5 and propagates through the inside of the light-guiding sheet 5. In this manner, the backlight 2 of the present embodiment is configured as a so-called edge-lit type of backlight.

The reflective plate 7 is constituted by, for example, a foamed PET (polyethylene terephthalate) sheet and an aluminum sheet. The foamed PET sheet is formed as a sheet after imparting minute air bubbles into transparent PET during the manufacturing process. Light incident to the foamed PET sheet is refracted by the air bubbles and emitted once again to the outside of the foamed PET sheet. Because light is refracted at the boundaries between the transparent PET and the air bubbles, light loss is low and it is possible to achieve a low-cost reflective plate with high reflectivity. The aluminum sheet is integrated with the foamed PET sheet in order to maintain the rigidity of the overall reflective plate and functions as the base material of the foamed PET sheet. The reflective plate 7 has the function of reflecting light that has reached the rear surface of the light-guiding sheet 5 (surface on the opposite side from the side on which the optical sheet group 8 is disposed) toward the liquid crystal panel 3.

The power transmitting coil 4 is, for example, a sheet coil formed by a copper thin film. To avoid an increase in the thickness of the liquid crystal module 1, it is desirable to use a thin coil, such as a sheet coil, as the power transmitting coil 4. The power transmitting coil 4 has a conductor part 4a having a long, wound conductor and two lead parts 4b leading out from the center side and from the circumferential side of the conductor part 4a.

The power transmitting coil 4 is adhered to the rear surface of the reflective plate 7 (the surface on the side opposite the side on which the light-guiding sheet 5 is disposed) by an adhesive material 9. The power transmitting coil 4 has a size that corresponds to one of the regions of the division into two of the long side direction of the rectangularly shaped liquid crystal panel 3, and is affixed so as to match that region. It is desirable that an insulating material such as plastic be used as the adhesive material 9. The reason for this is that, if an insulating material such as plastic is used, heat is not generated because of eddy current losses when it is placed in an alternating current magnetic field. The power transmitting coil 4 may be adhered to the reflective plate 7 in the condition in which it is covered by a metal magnetic sheet or the like. Although the power transmitting coil 4 is shown as being circular in FIG. 1, it may have a different shape, such as rectangular.

The optical sheet group 8 is laminated in the sequence of the diffusing sheet 10, the lens sheet 11, and the diffusing sheet 12 from the light-guiding sheet 5 side. The two diffusing sheets 10 and 12 each have the function of diffusing and reducing the intensity variation of light emitted from the front surface of the light-guiding sheet 5. The lens sheet 11 has the function of collecting and adjusting the angular distribution of the light emitted from the front surface of the light-guiding sheet 5. In this manner, the intensity distribution and angular distribution of the light emitted from the light-guiding sheet 5 are adjusted by optical sheet group 8 constituted by the diffusing sheet 10, the lens sheet 11, and the diffusing sheet 12.

The specific constitution of the liquid crystal panel 3 will be described below, using FIG. 2.

Although the description in this case will be for the example of an active-matrix transmission-type liquid crystal panel, the liquid crystal panel to which the present invention can be applied is not restricted to being an active-matrix transmission-type liquid crystal panel. The liquid crystal panel may be, for example, a semi-transmission (combined transmission and reflection) type liquid crystal panel or, alternatively, may be a simple matrix liquid crystal panel in which each pixel does not have a switching thin-film transistor (abbreviated TFT).

As shown in FIG. 2, the liquid crystal cell 40 of the liquid crystal panel 3 has a TFT substrate 41, a color filter substrate 42, and a liquid crystal layer 43. The TFT substrate 41 has a plurality of TFTs as switching elements. The color filter substrate 42 has color filters 31 and is disposed in opposition to the TFT substrate 41. The liquid crystal layer 43 is injected into a space surrounded by the TFT substrate 41 and the color filter substrate 42 and a frame-shaped sealing material (not shown) adhered so that there is a prescribed spacing between the TFT substrate 41 and the color filter substrate 42.

The liquid crystal cell 40 displays, for example, in VA mode. In this case, a liquid crystal having a negative dielectric constant anisotropy is used in the liquid crystal layer 43. Columnar spacers 44 are disposed between the TFT substrate 41 and the color filter substrate 42 to maintain a uniform spacing between the substrates. The spacers 44 are made, for example, of resin, and are formed by photolithography technology.

A first polarizing sheet 45 functioning as a light detector is disposed on the front surface side of the liquid crystal cell 40. A second polarizing sheet 46 functioning as a polarizer is disposed on the rear surface side of the liquid crystal cell 40. A first phase shifting sheet 47 for compensating the phase difference of light is provided between the first polarizing sheet 45 and the second polarizing sheet 46. In the same manner, a second phase shifting sheet 48 for compensating the phase difference of light is provided between the second polarizing sheet 46 and the liquid crystal cell 40.

A plurality of subpixels that are the smallest unit regions of display are disposed in a matrix on the TFT substrate 41. A plurality of source bus lines are disposed to extend mutually parallel to one another on the TFT substrate 41. A plurality of gate bus lines are disposed on the TFT substrate 41 to extend mutually parallel to one another and also orthogonal with respect to the plurality of source bus lines. That is, a plurality of source bus lines and a plurality of gate bus lines are formed in a lattice configuration on the TFT substrate 41. A rectangularly shaped region delineated by source bus lines and gate bus lines is one subpixel. The source bus lines are connected to source electrodes of the TFTs, to be described later. The gate bus lines are connected to the gate electrodes of the TFTs.

A TFT 19 having a semiconductor layer 15, a gate electrode 16, a source electrode 17, and a drain electrode 18 and the like is formed on the surface of the liquid crystal layer 43 side of a transparent substrate 14 of the TFT substrate 41. A glass substrate, for example, can be used as the transparent substrate 14. The semiconductor layer 15 is formed over the transparent substrate 14. The semiconductor layer 15 is made of, for example, amorphous silicon, polycrystalline silicon, or an oxide semiconductor. In addition to semiconductor materials, such as CGS (continuous grain silicon), LPS (low-temperature polysilicon), and α-Si (amorphous silicon), a specific example of a material for forming the semiconductor layer 15 can be an oxide semiconductor (InGaZnO) known as IGZO, made of indium (In), gallium (Ga), and zinc (Zn). In addition to IGZO an In—Zn—O based oxide semiconductor known as IZO made of indium (In) and zinc (Zn) and a Zn—Ti—O based oxide semiconductor known as ZTO made of zinc (Zn) and titanium (Ti) can be used.

A gate insulating film 20 is formed on the transparent substrate 14 so as to cover the semiconductor layer 15. For example, as a material for the gate insulating film 20, a silicon oxide film, a silicon nitride film, or a laminated film thereof can be used. The gate electrode 16 or the like is formed on the gate insulating film 20 so as to oppose the semiconductor layer 15. For example, as a material for the gate electrode 16, a laminated film of W (tungsten)/TaN (tantalum nitride), Mo (molybdenum), Ti (titanium), Al (aluminum) or the like can be used.

A first interlayer insulating film 21 is formed on the gate insulating film 20 so as to cover the gate electrode 16. For example, as a material for the first interlayer insulating film 21, a silicon oxide film, a silicon nitride film, or a laminate thereof can be used. The source electrode 17 and the drain electrode 18 are formed on the first interlayer insulating film 21. The source electrode 17 is connected to the source region of the semiconductor layer 15 via a contact hole 22 passing through the first interlayer insulating film 21 and the gate insulating film 20. In the same manner, the drain electrode 18 is connected to the drain region of the semiconductor layer 15 via a contact hole 23 passing through the first interlayer insulating film 21 and the gate insulating film 20. A conducting material similar to that of the above-described gate electrode 16 can be used as the material of the source electrode 17 and the drain electrode 18. A second interlayer insulating film 24 is form on the first interlayer insulating film 21 so as to cover the source electrode 17 and the drain electrode 18. The same type of material as the above-described first interlayer insulating film 21 or an organic insulating material can be used as the material of the second interlayer insulating film 24.

A pixel electrode 25 is formed over the second interlayer insulating film 24. The pixel electrode 25 is connected to the drain electrode 18 via a contact hole 26 that passes through the second interlayer insulating film 24. Thus, as a relay electrode the pixel electrode 25 connects the drain electrode 18 to the drain region of the semiconductor layer 15. The material used for the pixel electrode 25 is a transparent conductive material such as, for example, ITO, IZO (indium zinc oxide) or the like. By this constitution, when a scanning signal is supplied to a gate electrodes 16 via the gate bus lines, the TFT 19 goes into the on state. When this occurs, an image signal supplied to the source electrode 17 via the source bus line is supplied to the pixel electrode 25 via the semiconductor layer 15 and the drain electrode 18.

The form of the TFT may be the top-gate TFT shown in FIG. 2, or may be a bottom-gate TFT.

On the surface of the liquid crystal layer 43 side of the transparent substrate 29 of the color filter substrate 42 are formed, in sequence, a black matrix 30, color filters 31, a planarization layer 32, an opposing electrode 33, and an orientation film 34. The black matrix 30 has the function of blocking the passage of light in regions between pixels. The black matrix 30 is formed by a metal that is Cr (chromium) or a multilayer film of Cr and chromium oxide, or by a photoresist in which carbon particles have been dispersed into a photosensitive resin.

The color filters 31 include dyes for red (R), green (G), and blue (B), and one of the R, G, and B color filters 31 is disposed so as to be in opposition to one pixel electrode 25 on the TFT substrate 41. The region in which one color filter 31 of R, G, and B is disposed constitutes a subpixel. The three subpixels R, G, and B constitute one pixel.

The planarization layer 32 is constituted by an insulating film covering the black matrix 30 and the color filters 31. The planarization layer 32 has the function of alleviating and planarizing the steps caused by the black matrix 30 and the color filters 31. The opposing electrode 33 is formed over the planarization layer 32. The same type of transparent conductive material as in the pixel electrodes 25 is used as the material of the opposing electrode 33. The color filters 31 may have a constitution with more than the three colors R, G, and B.

In the TFT substrate 41, an orientation film 27 is formed over the entire surface of the second interlayer insulating film 24, so as to cover the pixel electrodes 25. In the color filter substrate 42, the orientation film 34 is formed over the entire surface, so as to cover the opposing electrode 33. The orientation film 27 and the orientation film 34 have an orientation controlling force that vertically orients the liquid crystal molecules of the liquid crystal layer 43, and are so-called vertical orientation films.

Although in this case the example of a VA mode liquid crystal panel is given, alternatively a TN mode liquid crystal panel, or a lateral electric field mode liquid crystal panel, such as an IPS or FFS type, may be used.

In the present embodiment, the above-noted liquid crystal module 1 is built into a tablet 50 as the display unit of the tablet 50 shown in FIG. 4.

As shown in FIG. 3, the tablet 50 has the liquid crystal module 1 having the liquid crystal panel 3 and the power transmitting coil 4, a liquid crystal panel drive board 51, a control circuit board 52, a charging/discharging control circuit 53, a secondary battery 54, a power transmitting circuit 55, an AC/DC converter 56 (voltage converter), and an AC power supply connector 57. Although the tablet 50 has other constituent elements as well, such as a touch panel, elements that are the same as in a conventional tablet will not be described.

The liquid crystal panel drive board 51 mounts electronic components constituting a control circuit or drive circuit and the like for the liquid crystal panel 3. The control circuit board 52 mounts electronic components constituting a control circuit and the like for the overall tablet. A lithium ion battery, for example, is used as the secondary battery 54. The secondary battery 54 stores electrical energy required to operate the tablet 50 and can be used repeatedly by charging it after discharging. The charging/discharging control circuit 53 controls the charging when the secondary battery 54 is charged by the output from the AC/DC converter 56, which will be described later, and controls the discharging when the tablet 50 operates from the output of the secondary battery 54.

The AC power supply connector 57 is for connecting to an AC power supply 59 via an AC power supply cable 58. The AC/DC converter 56 converts commercial alternating current voltage, for example 100 V obtained from the AC power supply 59, to a prescribed DC voltage, and supplies the DC voltage to the power transmitting circuit 55, to be described later, and the charging/discharging control circuit 53. The power transmitting circuit 55 uses the DC voltage from the AC/DC converter 56 to generate an alternating current of a prescribed frequency and supplies the generated alternating current voltage to the power transmitting coil 4.

Of the constituent components contributing to the transmission of power from the tablet 50, the power transmitting coil 4, as described above, is adhered to the rear surface of the reflective plate 7 of the liquid crystal module 1. The AC power supply connector 57 is disposed so that its connection port is exposed at the front surface of the tablet 50. The AC/DC converter 56 is a component in conventional tablets as well. However, the AC/DC converter 56 of the present embodiment needs to supply a direct current voltage not only to the secondary battery 54 side as is conventionally done, but also to the power transmitting coil 4 side. For this reason, the capacity of the AC/DC converter 56 must be larger than that of a conventional AC/DC converter. The AC/DC converter 56 may be disposed on the liquid crystal panel drive board 51 or on the control circuit board 52. In the same manner, the power transmitting circuit 55 may be disposed on the liquid crystal panel drive board 51 or the control circuit board 52.

FIG. 3 shows a power receiving unit 60 of the mobile telephone that is the device to be charged. The power receiving unit 60 of the mobile telephone has a power receiving coil 61, a power receiving circuit 62, a charging/discharging control circuit 63, and a secondary battery 64. The power receiving coil 61 receives a magnetic field generated by the power transmitting coil 4 and generates an induced electromotive force that is received as electrical power. If we consider charging efficiency, it is desirable that a sheet coil conforming to the same standard as the power transmitting coil 4 on the tablet 50 side (for example, the Qi standard of WPC) be used as the power receiving coil 61.

The power receiving circuit 62 rectifies the alternating current voltage induced in the power receiving coil 61 and generates a direct current voltage. The direct current voltage output from the power receiving circuit 62 is supplied to the secondary battery 64 via the charging/discharging control circuit 63, to be described later, and charges the secondary battery 64. The charging/discharging control circuit 63 controls charging when the secondary battery 64 is charged by the output from the power receiving circuit 62 and controls discharging when the mobile telephone operates by the output from the secondary battery 64. A lithium ion battery, for example, can be used as the secondary battery 64, the same as the secondary battery 54 of the tablet 50.

As shown in FIG. 4, when the user charges the mobile telephone, the user connects the power supply cable 58 to the tablet 50 and then connects the plug (not shown) of the power supply cable 58 to a power outlet or the like of the AC power supply 59. The user then places the mobile telephone 66 to be charged onto the liquid crystal display surface 50c of the tablet 50. When this is done, in order to perform charging efficiently, the user must place the mobile telephone 66 at a position at which the power transmitting coil 4 of the tablet 50 and the power receiving coil 61 of the mobile telephone 66 are in opposition to one another. However, because the power transmitting coil 4 is built into the tablet 50 and not visible to the user from the outside, there is a need for the user to have a guide so as to know the position at which the mobile telephone 66 is to be placed.

In the case of the present embodiment, in response to that need, because the mobile telephone 66 is placed on the liquid crystal display surface 50c of the tablet 50 as shown in FIG. 4, a mark used as a guide to the position of placing the mobile telephone 66 (for example, the circle marked by the symbol M) can be displayed on the liquid crystal display surface 50c. By the tablet 50 displaying the symbol M at the position of the power transmitting coil 4, the user can place the mobile telephone 66 at the optimum position, using the symbol M as a guide. Also, the tablet 50 may be constituted so as to become aware of the current charging status of the secondary battery 64 of the mobile telephone 66 and display the charging status (for example, a symbol J indicating that the charging is 50% completed) on the liquid crystal display surface 50c.

In the tablet 50, if the charging/discharging control circuit 53 detects the charging/discharging status of the secondary battery 54 and judges that the secondary battery 54 of the tablet 50 is not 100% charged, the charging of the secondary battery 54 of the tablet 50 starts at the point at which the user connects the tablet 50 to the AC power supply 59. When the user places the mobile telephone 66 onto to the tablet 50 in this condition, the secondary battery 54 of the tablet 50 and the secondary battery 64 of the mobile telephone 66 are simultaneously charged. If the secondary battery 54 of the tablet 50 is 100% charged, only the secondary battery 64 of the mobile telephone 66 is charged. Conversely, if the secondary battery 64 of the mobile telephone 66 is 100% charged, only the secondary battery 54 of the tablet 50 is charged.

Alternatively, the operation of the tablet may be made so that, rather than charging the secondary battery 54 of the tablet 50 and the secondary battery 64 of the mobile telephone 66 in parallel, only one of the secondary batteries 54 and 64 is charged preferentially. In this case, the designer of the tablet 50 decides beforehand which of the secondary batteries 54 and 64 is to be preferentially charged and this is stored in the control unit. Alternatively, the constitution may be made so that, in response to a request from the user of the tablet, the user can select which battery of the secondary batteries 54 and 64 is to be charged preferentially.

As described above, in the present embodiment, because the tablet 50 has the function of a contactless charger, if this type of tablet 50 is carried around, it is possible to charge a mobile electronic device such as the mobile telephone 66, without using a dedicated contactless charger. For this reason, it is not necessary for the user to carry a contactless charger when going outside or on a trip. Seen from the user of the tablet 50, the convenience is greatly improved by the elimination of one device to carry. Also, because the constitution is such that a mobile electronic device such as the mobile telephone 66 is charged by placing it on the liquid crystal display surface 50c of the tablet 50, it is possible to display the symbol M indicating the position for placement of the mobile electronic device or the symbol J indicating the charging status, thereby facilitating operation by the user.

Second Embodiment

The second embodiment of the present invention will be described below, with references made to FIG. 5.

The basic configuration of the tablet of the present embodiment is the same as that of the first embodiment. In the present embodiment, the manner of installation of the power transmitting coil differs from that of the first embodiment.

Figure 5:
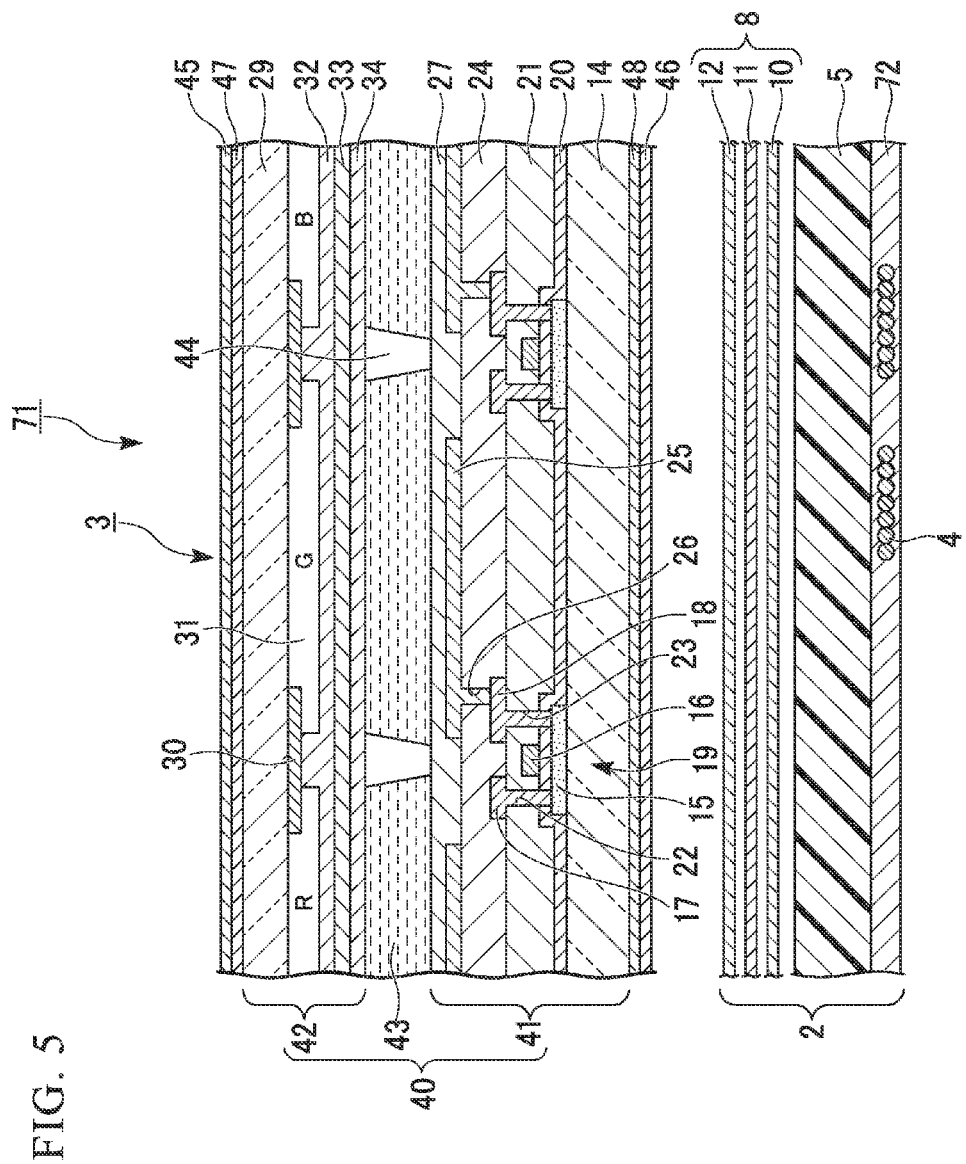
FIG. 5 is a cross-sectional view of a liquid crystal module according to a second embodiment.

FIG. 5 is a cross-sectional view of a liquid crystal module mounted in a tablet of the present embodiment. In FIG. 5, constituent elements that are in common with those in FIG. 2 showing the first embodiment are assigned the same reference symbols, and the descriptions thereof are omitted.

In the liquid crystal module 1 of the first embodiment, the power transmitting coil 4 is adhered to the rear surface of the reflective plate 7. In contrast, in the liquid crystal module 71 of the present embodiment, the power transmitting coil 4 is embedded within the reflective plate 7, as shown in FIG. 5. In order to achieve a structure in which the power transmitting coil 4 is embedded, in the manufacturing process of the reflective plate 7, for example, the two leads 4b (refer to FIG. 1) are left and only the conductor part 4a is embedded between the base material and the foamed PET layer. Other constituent elements are the same as in the first embodiment.

In the present embodiment as well, the same effect is achieved as in the first embodiment, in that it is possible to implement a liquid crystal module and a tablet that perform contactless charging of a mobile electronic device or the like without using a dedicated contactless charger. In particular in the case of the present embodiment, because the power transmitting coil 4 is embedded within the reflective plate 72, in addition to making the liquid crystal module 71 thin, it is possible to improve the reliability of the power transmitting coil 4.

Third Embodiment

The third embodiment of the present invention will be described below, with references made to FIG. 6.

The basic configuration of the tablet of the present embodiment is the same as that of the first embodiment. In the present embodiment, the manner of connection of the tablet to the AC power supply differs from that of the first embodiment.

Figure 6:
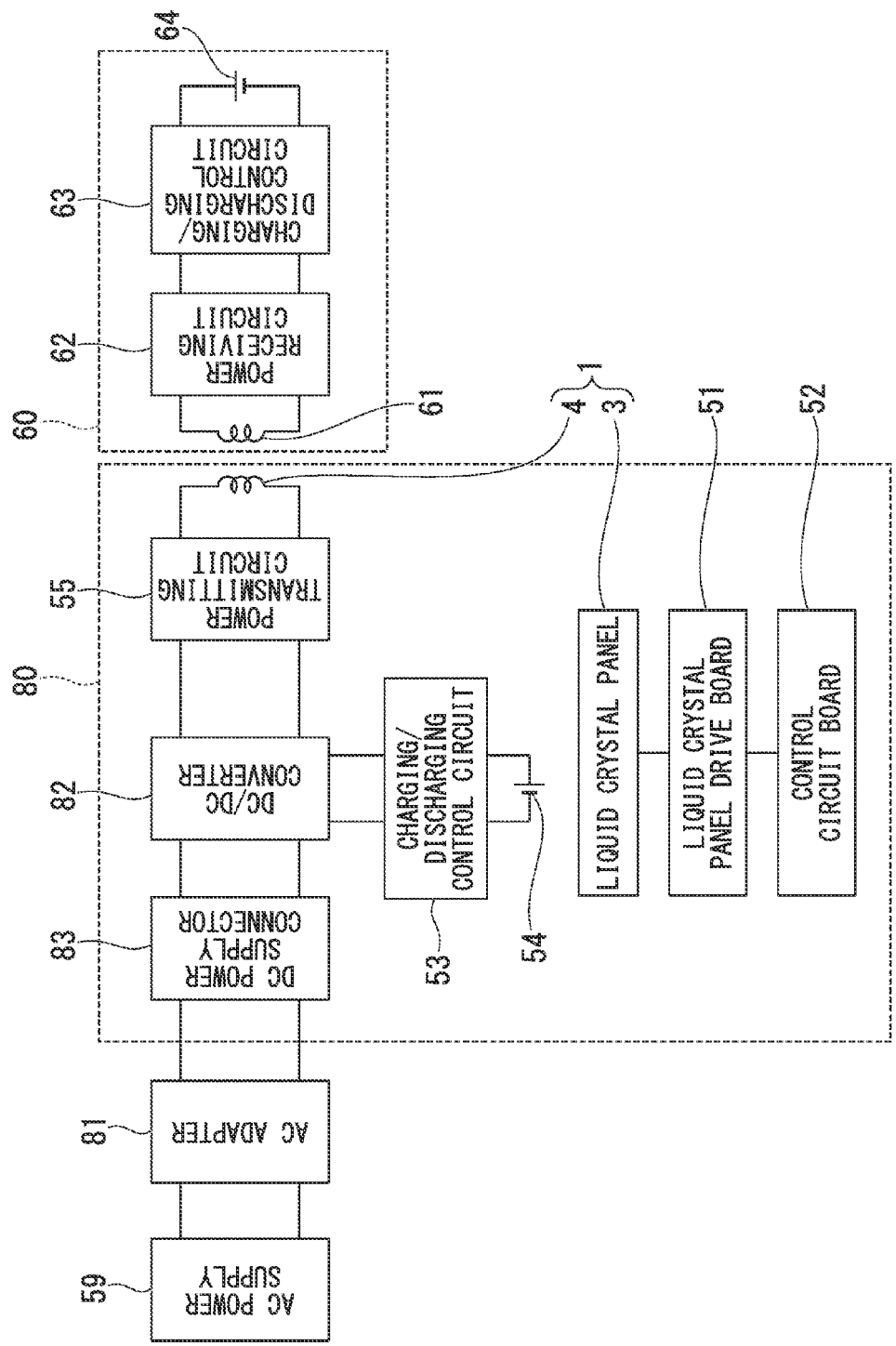
FIG. 6 is a circuit block diagram of an electronic device according to a third embodiment.

FIG. 6 is a circuit block diagram of the tablet of the present embodiment. In FIG. 6, constituent elements that are in common with those in FIG. 3 showing the first embodiment are assigned the same reference symbols and the descriptions thereof are omitted.

In the first embodiment, the tablet 50 was connected to the AC power supply 59 via the power supply cable 58. In contrast, in the present embodiment, a tablet 80 connects to the AC power supply 59 via an AC adapter 81, as shown in FIG. 6. In the case of the present embodiment, a DC/DC converter 82 is used as the voltage converter in place of the AC/DC converter 56 of the first embodiment. The DC/DC converter 82 is a type of switching circuit that converts a voltage by on/off operations. Additionally, a DC power supply connector 83 is used in place of the AC power supply connector 57. Other constituent elements are the same as in the first embodiment.

In the present embodiment as well, the same effect as the first and second embodiments is achieved, in that it is possible to implement a liquid crystal module and a tablet that perform contactless charging of a mobile electronic device or the like without using a dedicated contactless charger.

Fourth Embodiment

The fourth embodiment of the present invention will be described below, with references made to FIG. 7 to FIG. 9.

The basic constitution of the tablet of the present embodiment is the same as that of the first embodiment. In the present embodiment, the provision of two power transmitting coils is a point of difference with respect to the first embodiment.

Figure 7:
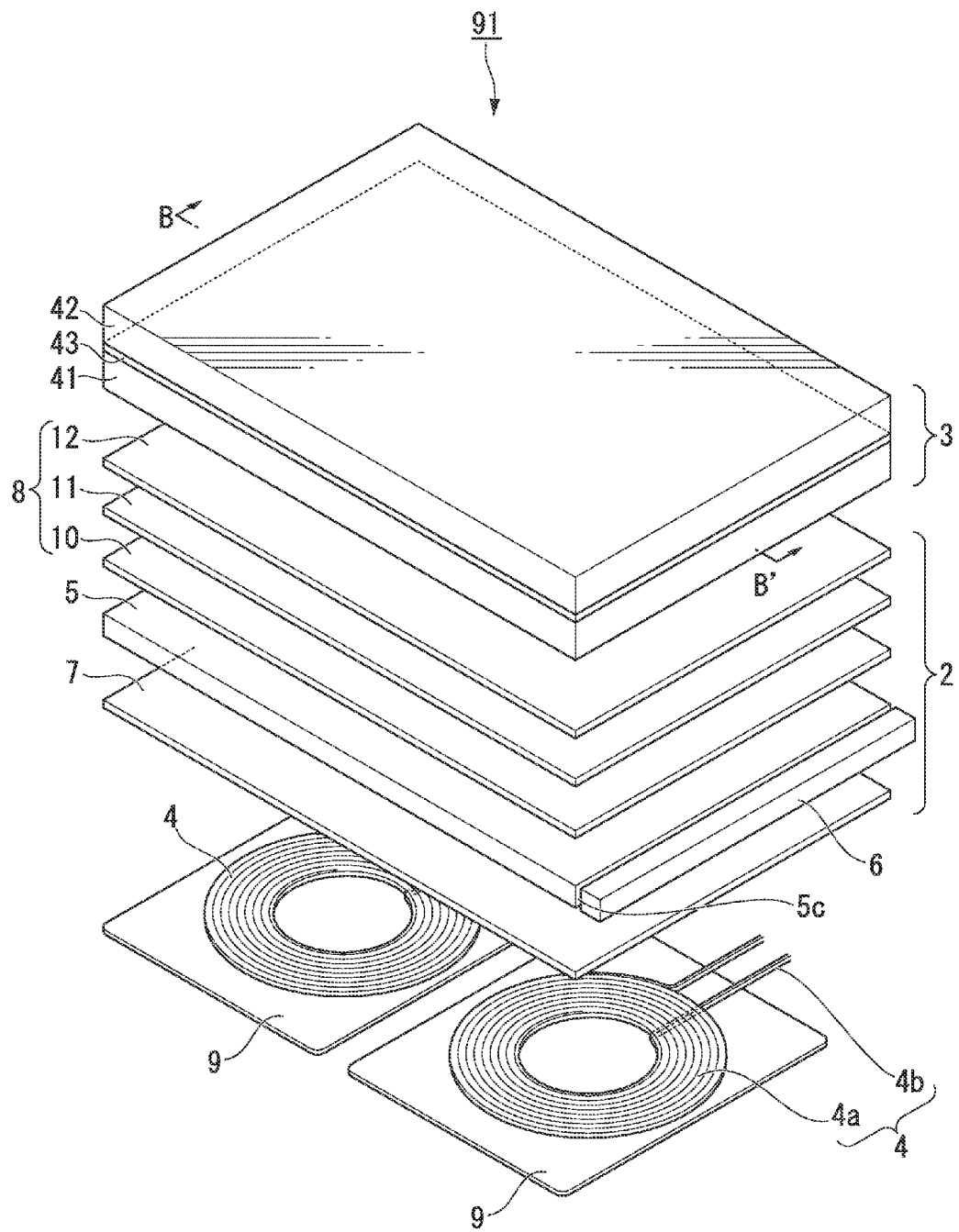
FIG. 7 is an oblique view showing a liquid crystal module according to a fourth embodiment.

FIG. 7 is an oblique view showing a liquid crystal module of the present embodiment. FIG. 8 is a cross-sectional view along the line B-B' in FIG. 7. FIG. 9 is an oblique view showing the condition in which charging is done using the tablet of the present embodiment.

Figure 8:
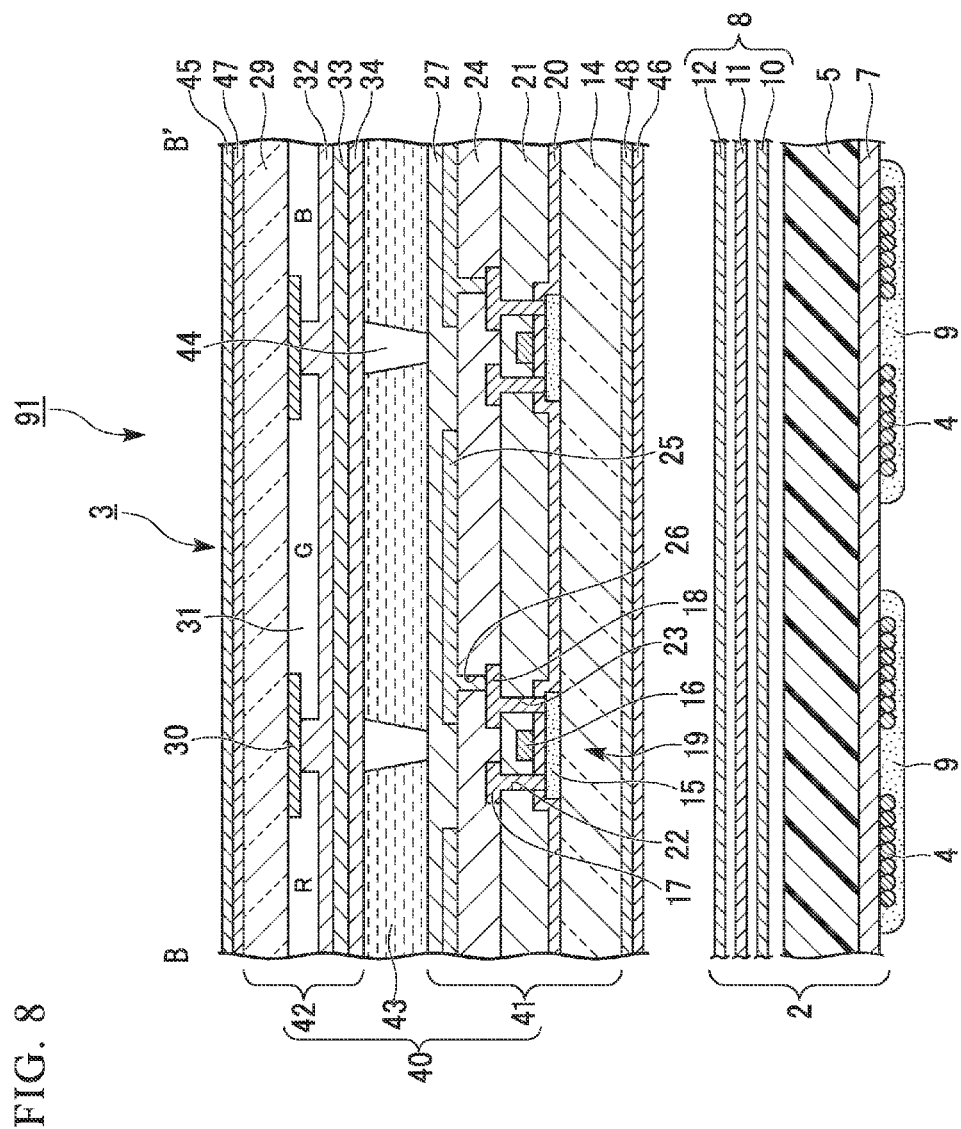
FIG. 8 is a cross-sectional view along the line B-B' in FIG. 7.
Figure 9:
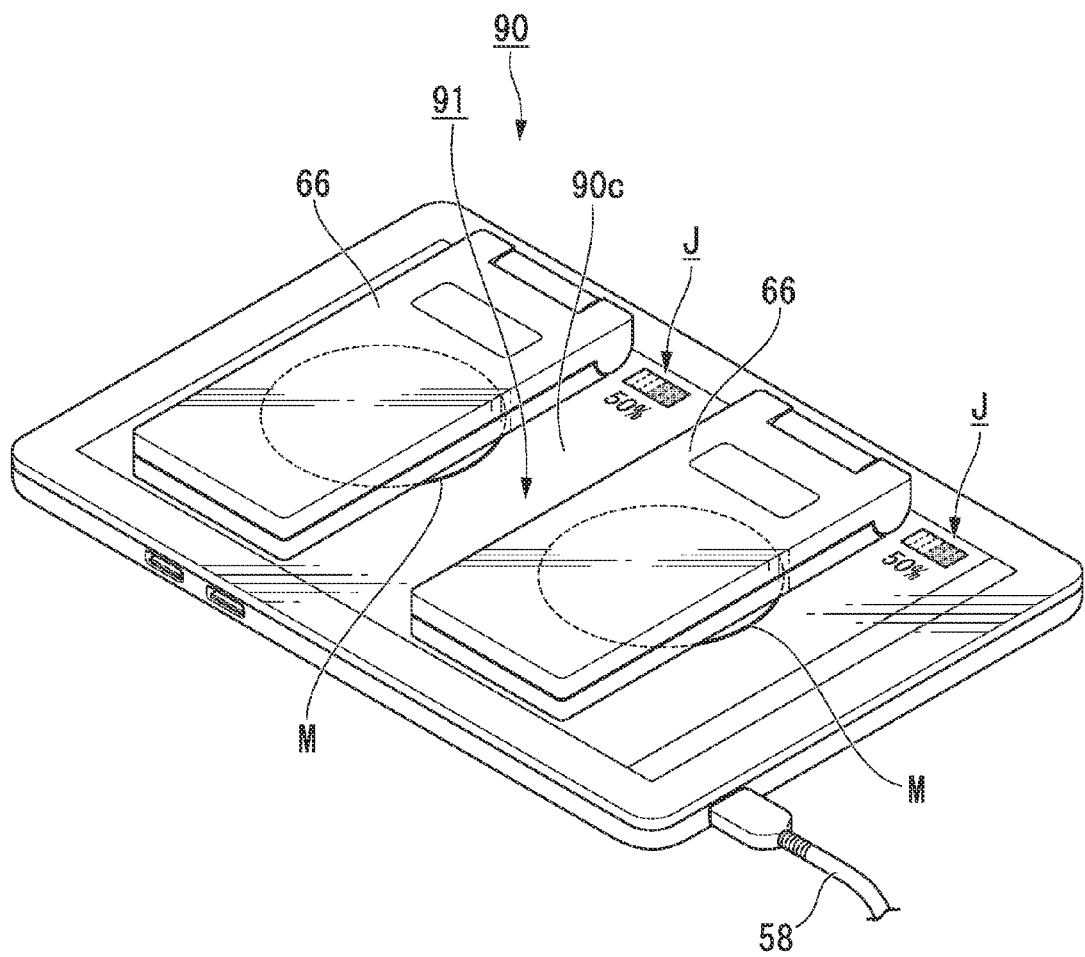
FIG. 9 is an oblique view showing the condition in which charging is performed using an electronic device according to the fourth embodiment.

In FIG. 7 to FIG. 9, constituent elements in common with those in FIG. 1, FIG. 2, and FIG. 4 of the first embodiment are assigned the same reference symbols and the descriptions thereof are omitted.

As shown in FIG. 7 and FIG. 8, a liquid crystal module 91 of the present embodiment has two power transmitting coils 4. The two power transmitting coils 4 are adhered to the rear surface of the reflective plate 7 by the adhesive material 9. One power transmitting coil 4 has a size that corresponds to one of the regions of the division into two of the long side of the rectangularly shaped liquid crystal panel 3. The two power transmitting coils 4 are disposed so as to be arranged in the longitudinal direction of the liquid crystal panel 3. It is desirable that an insulating material such as plastic be used as the adhesive material 9. The power transmitting coil 4 may be adhered to the reflective plate 7 in a condition in which it is covered by a metal magnetic sheet or the like. Although the power transmitting coil 4 is shown as being circular in FIG. 7, it may have a different shape, such as rectangular. These points are the same as in the first embodiment. Other elements are also the same as in the first embodiment.

A tablet 90 of the present embodiment, as shown in FIG. 9, can charge two mobile telephones 66 simultaneously. If a user is to charge two mobile telephones 66, the user connects the tablet 90 to the AC power supply 59 (not shown) via the power supply cable 58, and places the two mobile telephones 66 on the liquid crystal display surface 90c of the tablet 90. In the case of the present embodiment, two symbols M are displayed on the liquid crystal display surface 90c and serve as guides to the positions for placing the mobile telephones 66. The charging status J of each mobile telephone 66 may be displayed on the liquid crystal display surface 90c.

In the tablet 90, if the charging/discharging control circuit detects the charging/discharging status of the secondary battery and judges that the secondary battery of the tablet 90 is not 100% charged, the charging of the secondary battery of the tablet 90 starts at the point at which the user connects the tablet 90 to the AC power supply 59. When the user places two mobile telephones 66 in this condition onto to the tablet 90, the secondary battery of the tablet 90 and the secondary batteries of the two mobile telephones 66 are simultaneously charged. If the secondary battery of the tablet 90 is 100% charged, only the secondary batteries of the two mobile telephones 66 are charged. Conversely, if the secondary batteries of the two mobile telephones 66 are 100% charged first, only the secondary battery of the tablet 90 is charged.

Alternatively, the operation of the tablet may be made so that, rather than charging the secondary battery of the tablet 90 and the secondary batteries of the two mobile telephones 66 in parallel, the secondary batteries of only one are charged preferentially. In this case, the designer of the tablet 90 decides beforehand which of the secondary batteries is to be preferentially charged and this is stored in the control unit. Alternatively, the constitution may be made so that, in response to a request from the user of the tablet, one of the secondary batteries selected by the user is charged preferentially. Additionally, the secondary battery of one of the two mobile telephones 66 may be charged preferentially. In this case, the constitution may be such that the user can select the battery of which mobile telephone 66 is to be charged preferentially.

In the present embodiment as well, the same effect is achieved as in the first to the third embodiments, in that it is possible to implement a liquid crystal module and a tablet that perform contactless charging of a mobile electronic device or the like without using a dedicated contactless charger. In particular in the case of the present embodiment, it is possible to charge mobiles devices such as two mobile telephones 66 or the like simultaneously using one tablet 90. For this reason, it is possible to charge simultaneously the mobile telephones of two people outside on, for example, a family trip.

Fifth Embodiment

The fifth embodiment of the present invention will be described below, using FIG. 10.

The basic constitution of the tablet of the present embodiment is the same as that of the fourth embodiment. In the present embodiment, the manner of installation of the power transmitting coils is different from that of the fourth embodiment.

Figure 10:
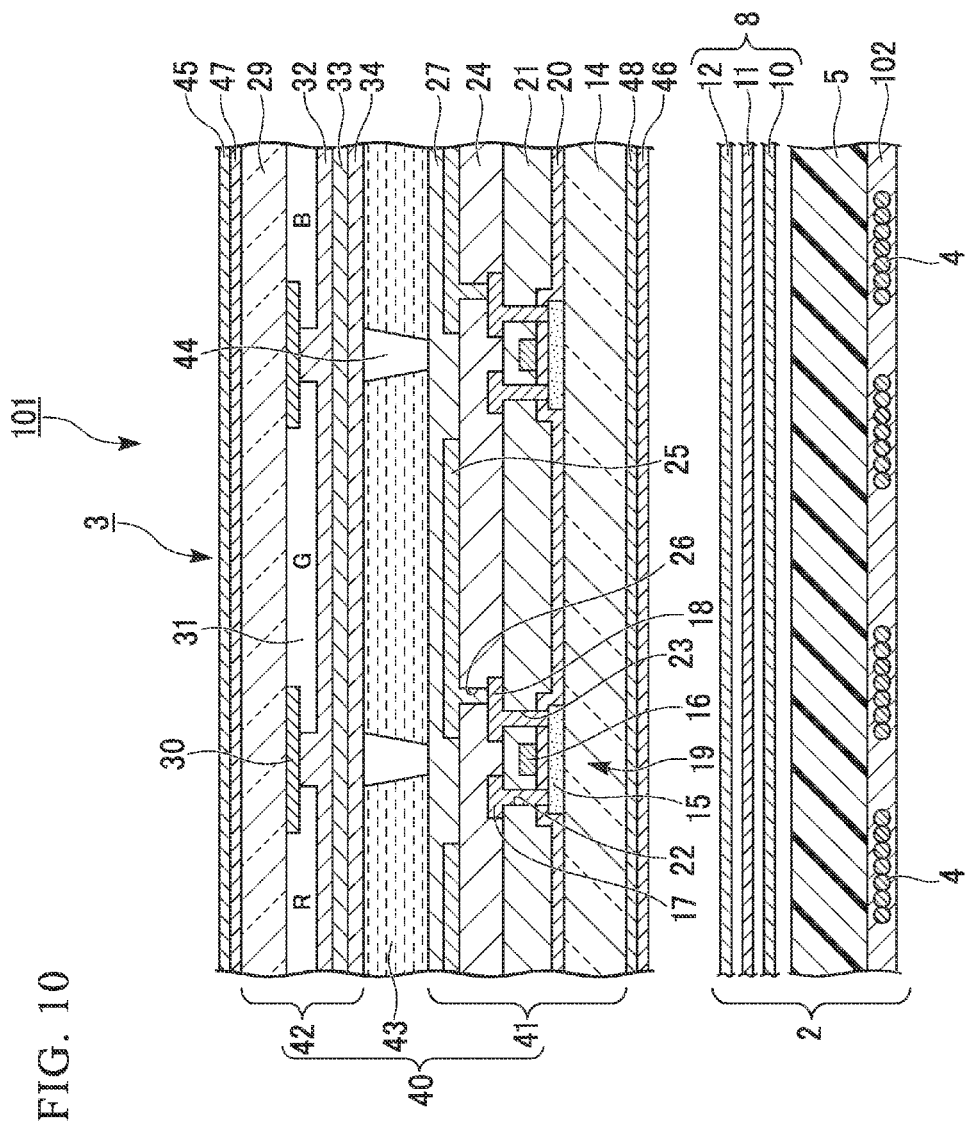
FIG. 10 is a cross-sectional view showing a liquid crystal module according to a fifth embodiment.

FIG. 10 is a cross-sectional view of a liquid crystal module mounted in a tablet of the present embodiment. In FIG. 10, constituent elements that are in common with those of FIG. 8 of the fourth embodiment are assigned the same reference numerals and the descriptions thereof are omitted.

In the liquid crystal module 91 of the fourth embodiment, the two power transmitting coils 4 have been adhered to the rear surface of the reflective plate 7. In contrast, in the liquid crystal module 101 of the present embodiment, as shown in FIG. 10, the two power transmitting coils 4 are embedded within a reflective plate 102. In order to achieve a structure in which the power transmitting coil 4 is embedded, in the manufacturing process of the reflective plate 102, for example, the two leads are left and only the conductor part of the power transmitting coil 4 is embedded between the base material and the foamed PET layer. Other constituent elements are the same as in the fourth embodiment.

In the present embodiment as well, the same effect is achieved as in the first to fourth embodiments, in that it is possible to implement a liquid crystal module and a tablet that perform contactless charging of a mobile electronic device or the like without using a dedicated contactless charger. In particular in the case of the present embodiment, because the power transmitting coil 4 is embedded in the reflective plate 102, in addition to making the liquid crystal module 101 thin, it is possible to improve the reliability of the power transmitting coil 4.

The technical scope of the present invention is not restricted to the above-noted embodiments, and can be subjected to various modifications within the scope of the spirit of the present invention.

For example, in the above-noted embodiments, a construction is adopted in which the power transmitting coil is adhered to the rear surface of the reflective plate or is being embedded into the reflective plate. Generally, an opaque metal such as copper wire is often used as the material of the power transmitting coil. For this reason, the power transmitting coil cannot be disposed in a path through which light passes, and has been disposed on the rear surface of the reflective plate or embedded thereinto. However, if it is possible to make a transparent power transmitting coil, the power transmitting coil may be disposed in a path through which light further to the front surface side than the reflective plate passes.

Also, in the above-noted embodiments, examples of a mobile telephone that is charged on top of the liquid crystal display surface of a tablet were shown. In place of that constitution, the constitution might be made such that the mobile telephone is placed on the rear surface of the table (the side opposite from the liquid crystal display surface side) and charged. In this case, for example, the arrangement can be that the tablet is placed face-down on a table and the mobile telephone place on the rear surface of the tablet. Alternatively, the constitution may be made such that a mobile telephone is held to the rear surface of the tablet by some arbitrary method, with the tablet placed with the liquid crystal display surface upward, enabling use of the liquid crystal display surface of the tablet while charging the mobile telephone.

Although the above-noted embodiments gave the example of a tablet as the electronic device of the present invention, there is no restriction to being a tablet, and the present invention can be applied also to other electronic devices, for example, to a notebook type personal computer. Also, the electronic device to be charged may be a mobile electronic device other than a mobile telephone. In addition, the details of the constitution, such as the number, shape, and disposition of constituent elements of the liquid crystal module and the electronic device of the present invention are not restricted to those shown above, and can been changed as appropriate.

INDUSTRIAL APPLICABILITY

The present invention is usable in various electronic devices, such as a tablet-type personal computer or a notebook-type personal computer.

DESCRIPTION OF REFERENCE SYMBOLS 1, 71, 91, 101 Liquid crystal module
2 Backlight (lighting device)
3 Liquid crystal panel
4 Power transmitting coil
7, 72, 102 Reflective plate
50, 80, 90 Tablet (electronic device)
50c, 90c Liquid crystal display surface
51 Liquid crystal panel drive board
52 Control circuit board
55 Power transmitting circuit
56 AC/DC converter (voltage converter)
58 Power supply cable
59 AC power supply
66 Mobile telephone (device to be charged)
81 AC adapter
82 DC/DC converter (voltage converter)

The invention claimed is:

1. A liquid crystal module comprising:
a lighting device configured to emit a light;
a liquid crystal panel configured to be struck by the light emitted from the lighting device;
at least one power transmitting coil configured to receive a voltage from an AC power supply, generate a magnetic field, and transfer an electrical power to a device to be charged; and
a reflective plate disposed on a side of the lighting device opposite from a side on which the liquid crystal panel is disposed, wherein
the at least one power transmitting coil is provided on the reflective plate.

2. The liquid crystal module according to claim 1, wherein the at least one power transmitting coil is embedded within the reflective plate.

3. The liquid crystal module according to claim 1, wherein the at least one power transmitting coil is a plurality of power transmitting coils.

4. The liquid crystal module according to claim 1, further comprising:
a power transmitting circuit; and
a voltage converter, wherein
the power transmitting circuit, the voltage converter, and the at least one power transmitting coil constitute a power transmitting device.

5. The liquid crystal module according to claim 4, wherein the power transmitting circuit and the voltage converter are disposed on a drive board of the liquid crystal panel.

6. The liquid crystal module according to claim 4, wherein the voltage converter is an AC/DC converter, and a voltage from the AC power supply is supplied to the AC/DC converter via a power supply cable.

7. The liquid crystal module according to claim 4, wherein the voltage converter is a DC/DC converter, and a voltage from the AC power supply is supplied to the DC/DC converter via an AC adaptor.

8. A liquid crystal module comprising:
a lighting device configured to emit a light;
a liquid crystal panel configured to be struck by the light emitted from the lighting device; and
at least one power transmitting coil configured to receive a voltage from an AC power supply, generate a magnetic field, and transfer an electrical power to a device to be charged, wherein
a display surface of the liquid crystal panel is made as a surface on which the device to be charged is placed.

9. The liquid crystal module according to claim 8, wherein the at least one power transmitting coil is a plurality of power transmitting coils.

10. The liquid crystal module according to claim 8, further comprising:
a power transmitting circuit; and
a voltage converter, wherein
the power transmitting circuit, the voltage converter, and the at least one power transmitting coil constitute a power transmitting device.

11. The liquid crystal module according to claim 10, wherein
the power transmitting circuit and the voltage converter are disposed on a drive board of the liquid crystal panel.

12. The liquid crystal module according to claim 10, wherein
the voltage converter is an AC/DC converter, and a voltage from the AC power supply is supplied to the AC/DC converter via a power supply cable.

13. The liquid crystal module according to claim 10, wherein
the voltage converter is a DC/DC converter, and a voltage from the AC power supply is supplied to the DC/DC converter via an AC adaptor.

14. A liquid crystal module comprising:
a lighting device configured to emit a light;

a liquid crystal panel configured to be struck by the light emitted from the lighting device;

at least one power transmitting coil configured to receive a voltage from an AC power supply, generate a magnetic field, and transfer an electrical power to a device to be charged; and a reflective plate disposed on a side of the lighting device opposite from a side on which the liquid crystal panel is disposed, wherein the at least one power transmitting coil is installed on a surface of the reflective plate opposite from a side on which the lighting device is disposed.

15. The liquid crystal module according to claim 14, wherein the at least one power transmitting coil is a plurality of power transmitting coils.

16. The liquid crystal module according to claim 14, further comprising:

a power transmitting circuit; and a voltage converter, wherein the power transmitting circuit, the voltage converter, and the at least one power transmitting coil constitute a power transmitting device.

17. The liquid crystal module according to claim 16, wherein the power transmitting circuit and the voltage converter are disposed on a drive board of the liquid crystal panel.

18. The liquid crystal module according to claim 16, wherein the voltage converter is an AC/DC converter, and a voltage from the AC power supply is supplied to the AC/DC converter via a power supply cable.

19. The liquid crystal module according to claim 16, wherein the voltage converter is a DC/DC converter, and a voltage from the AC power supply is supplied to the DC/DC converter via an AC adaptor.

* * * * *